US009648346B2

(12) United States Patent
Zhang et al.

(10) Patent No.: US 9,648,346 B2
(45) Date of Patent: May 9, 2017

(54) MULTI-VIEW VIDEO COMPRESSION AND STREAMING BASED ON VIEWPOINTS OF REMOTE VIEWER

(75) Inventors: Cha Zhang, Sammamish, WA (US); Dinei A. Florencio, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1146 days.

(21) Appl. No.: 12/491,775

(22) Filed: Jun. 25, 2009

(65) Prior Publication Data

US 2010/0329358 A1 Dec. 30, 2010

(51) Int. Cl.
| | |
|---|---|
| *H04N 7/12* | (2006.01) |
| *H04N 19/54* | (2014.01) |
| *H04N 19/597* | (2014.01) |
| *H04N 19/115* | (2014.01) |
| *H04N 19/187* | (2014.01) |

(52) U.S. Cl.
CPC ........... *H04N 19/54* (2014.11); *H04N 19/115* (2014.11); *H04N 19/187* (2014.11); *H04N 19/597* (2014.11)

(58) Field of Classification Search
CPC ............ H04N 19/00769; H04N 13/00; H04N 13/0278; H04N 13/0282; H04N 13/0011; H04N 13/0014; H04N 19/597
See application file for complete search history.

(56) References Cited

U.S. PATENT DOCUMENTS

| | | | |
|---|---|---|---|
| 6,798,406 B1 | 9/2004 | Jones et al. | |
| 7,460,940 B2 * | 12/2008 | Larsson | A61B 3/113 180/272 |
| 7,468,745 B2 | 12/2008 | Xin et al. | |
| 2002/0122113 A1* | 9/2002 | Foote | G06T 3/4038 348/48 |

(Continued)

FOREIGN PATENT DOCUMENTS

WO 2008051041 A1 5/2008

OTHER PUBLICATIONS

Magnor, et al., "Multi-View Coding for Image-Based Rendering Using 3-D Scene Geometry", Retrieved at <<http://europa.cg.cs.tu-bs.de/publications/csvt02.pdf>>, IEEE Transactions on Circuits and Systems for Video Technology, vol. 13, No. 11, Nov. 2003, pp. 1-16.

(Continued)

*Primary Examiner* — Young Lee

(57) ABSTRACT

Multi-view video that is being streamed to a remote device in real time may be encoded. Frames of a real-world scene captured by respective video cameras are received for compression. A virtual viewpoint, positioned relative to the video cameras, is used to determine expected contributions of individual portions of the frames to a synthesized image of the scene from the viewpoint position using the frames. For each frame, compression rates for individual blocks of a frame are computed based on the determined contributions of the individual portions of the frame. The frames are compressed by compressing the blocks of the frames according to their respective determined compression rates. The frames are transmitted in compressed form via a network to a remote device, which is configured to render the scene using the compressed frames.

21 Claims, 10 Drawing Sheets

(56) References Cited

U.S. PATENT DOCUMENTS

| | | | |
|---|---|---|---|
| 2003/0068098 A1* | 4/2003 | Rondinelli et al. | 382/276 |
| 2003/0156260 A1* | 8/2003 | Putilin et al. | 353/10 |
| 2003/0231179 A1* | 12/2003 | Suzuki | 345/423 |
| 2004/0051680 A1* | 3/2004 | Azuma | G03B 13/28 345/8 |
| 2004/0104935 A1* | 6/2004 | Williamson et al. | 345/757 |
| 2004/0233527 A1* | 11/2004 | Palovuori | 359/464 |
| 2005/0117019 A1* | 6/2005 | Lamboray et al. | 348/159 |
| 2007/0109409 A1* | 5/2007 | Yea et al. | 348/153 |
| 2008/0219351 A1 | 9/2008 | Kim et al. | |
| 2008/0297593 A1* | 12/2008 | Debevec | G02B 27/225 348/51 |
| 2009/0169119 A1* | 7/2009 | Wegener | 382/232 |
| 2010/0097470 A1* | 4/2010 | Yoshida et al. | 348/159 |
| 2010/0195716 A1* | 8/2010 | Klein Gunnewiek et al. | 375/240.08 |
| 2010/0225735 A1* | 9/2010 | Shaffer et al. | 348/14.08 |

OTHER PUBLICATIONS

Cooke, et al., "Image-Based Rendering for Teleconference Systems", Retrieved at <<http://wscg.zcu.cz/wscg2002/Papers_2002/C61.pdf.zip>>, pp. 8.

Tong, et al., "Coding of Multi-View Images for Immersive Viewing", Retrieved at <<http://ieeexplore.ieee.org/stamp/stamp.jsp?arnumber=859194&isnumber=18643>>, IEEE 2000, pp. 1879-1882.

Li, et al., "A Novel Multi-View Video Coding Scheme Based on H.264", Retrieved at <<http://ieeexplore.ieee.org/stamp/stamp.jsp?arnumber=1292501&isnumber=28788>>, ICICS-PCM 2003, Dec. 15-18, 2003, pp. 493-497.

Yang, et al., "A Multi-stream Adaptation Framework for Bandwidth Management in 3D Tele-immersion", Retrieved at <<http://cairo.cs.uiuc.edu/teleimmersion/files/zhenyu_nossdav_2006.pdf, NOSSDAV 2006, pp. 6.

Kubota, et al., "Multi-View Imaging and 3DTV", Retrieved at <<http://ieeexplore.ieee.org/stamp/stamp.jsp?arnumber=4388078&isnumber=4387664>>, IEEE Signal Processing Magazine, Nov. 2007, pp. 10-21.

Yang, et al., "Viewcast: View Dissemination and Management for Multi-Party 3d Tele-Immersive Environments", Retrieved at <<https://netfiles.uiuc.edu/zyang2/www/publication/fp33a_yang.pdf>>, MM'07, Sep. 23-28, 2007, pp. 11.

Baker, et al., "The Coliseum Immersive Teleconferencing System", Retrieved at <<http://www.hpl.hp.com/techreports/2002/HPL-2002-351.pdf>>, Dec. 19, 2002, pp. 8.

Flierl, et al., "Multiview Video Compression", Retrieved at <<http://www.stanford.edu/~bgirod/pdfs/FlierISPMag2007.pdf>>, IEEE Signal Processing Magazine, Jul. 27, 2007, pp. 22.

Smolic, et al., "Interactive 3-d Video Representation and Coding Technologies", Retrieved at <<http://ieeexplore.ieee.org/stamp/stamp.jsp?arnumber=1369701&isnumber=29978>>, Proceedings of the IEEE, vol. 93, No. 1, Jan. 2005, pp. 98-110.

Zhang, et al., "Interactive Browsing of 3D Environment over the Internet", Retrieved at <<http://amp.ece.cmu.edu/publication/Cha/vcip01_Cha.pdf, pp. 12.

Zhang, et al., "A Survey on Image-based Rendering—Representation, Sampling and Compression", Retrieved at<<http://amp.ece.cmu.edu/Publication/Cha/tr03_03.pdf>>, Jun. 2003, pp. 1-45.

Zitnick, et al., "High-Quality Video View Interpolation using a Layered Representation", Retrieved at <<http://research.microsoft.com/en-us/um/people/larryz/zitnicksig04.pdf>>, pp. 9.

Buehler, et al., "Unstructured Lumigraph Rendering", Retrieved at <<http://groups.csail.mit.edu/graphics/pubs/siggraph2001_ulr.pdf>>, pp. 8.

Kurutepe, et al."Selective Streaming of Multi-View Video for Head-Tracking 3D Displays", 2007 IEEE, ICIP 2007, pp. 77-80.

Kurutepe, et al."Client-Driven Selective Streaming of Multiview Video for Interactive 3DTV", IEEE Transactions on Circuits and Systems for Video Technology, vol. 17, No. 11, Nov. 2007, pp. 1558-1565.

Shi, et al."View-Dependent Real-Time 3D Video Compression for Mobile Devices ", MM'08, Oct. 26-31, 2008, Vancouver, British Columbia, Canada, pp. 4.

Yang, et al."Enabling Multi-party 3D Tele-immersive Environments with ViewCast", ACM Transactions on Multimedia Computing, Communications and Applications, vol. x, No. x, xx 200x, pp. 111-139.

Xin, et al."View Synthesis for Multiview Video Compression ", TR2006-035 May 2006, pp. 8.

Kauff, et al."Depth map creation and image-based rendering for advanced 3DTV services providing interoperability and scalability ", Signal Processing: Image Communication 22 (2007) 217-234, Received Nov. 17, 2006, pp. 217-234.

* cited by examiner

240 receive macro-frame and depth map of scene

242 split view, from viewpoint to depth map, into rays (view rays)

248 trace each view ray to surface of depth map to obtain intersection with surface of depth map

250 where each view ray intersects depth map, project a ray from the point of intersection back to a position of a nearby camera (preferably, only to the nearest cameras)

252 compute intensity (weight) of view rays based on corresponding projected rays

MULTI-VIEW VIDEO COMPRESSION AND STREAMING BASED ON VIEWPOINTS OF REMOTE VIEWER

BACKGROUND

Advances in camera, display and networking technology have enabled a new set of applications for three dimensional (3D) scene communications. Such applications include 3D TV/free viewpoint TV (FTV), tele-immersive environments, immersive teleconferencing, etc. These applications typically employ multiple video cameras to simultaneously acquire a visual scene from different viewpoints. The video from these cameras, called multi-view video, is then transmitted to a remote end for rendering, providing the user with an immersive experience.

Due to the high raw data rate of multi-view video, compression of multi-view video may help enable applications such as 3D communication. Researchers have studied extensively on predictive coding for multi-view video compression, taking advantage of redundancy across the videos from different viewpoints. Such compression is typically based on the multi-view video data and involves inter-frame analysis (comparing frames of different cameras) and temporal analysis. Constraints for compression, such as delay constraints and random accessibility have been devised.

Because 3D TV is one of the most dominant driving forces of multi-view video, most multi-view video compression schemes assume a two-stage process—an offline stage for compression and an online stage for streaming. The videos are first compressed with advanced predictive coding schemes and are then stored. When transmitting to the remote end, all streams are sent across the network for decoding and rendering. In the 3D TV scenario, the video data may be transmitted through multicast channels, which can be efficient if there are thousands of remote viewers.

With 3D TV and other applications, it may be desirable to generate images from arbitrary points for both viewpoint selection and parallax simulation. Viewpoint selection, sometime called free-viewpoint video, involves allowing a user to select a desired point of view and then generating video from that viewpoint using video data from multiple cameras. Unless a broadcast medium is used, a server at the capturing/transmitting end may generate the desired view, encode it, and send the view to the user. However, to date, effective compression of multi-view video (where multiple camera feeds are transmitted) for parallax simulation and other viewpoint-dependent effects has not been accomplished.

Techniques related to compression of multi-view video are described below.

SUMMARY

The following summary is included only to introduce some concepts discussed in the Detailed Description below. This summary is not comprehensive and is not intended to delineate the scope of the claimed subject matter, which is set forth by the claims presented at the end.

A viewpoint, possibly sent by a remote participant and reflecting the remote participant's physical viewpoint, is used for compression of multi-view video. A terminal capturing the multi-view video renders a virtual view (synthetic image) for the viewpoint using frames of the multi-view video (frames from different cameras), thus obtaining a set of weight maps for the frames. The weight maps may be used to control an adaptive compression scheme to maximize coding efficiency while minimizing network bandwidth usage. Blocks of a frame may vary in their rate of compression in accordance with corresponding weights of the frame.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 3 shows a process for compressing a macro-frame of multi-view video.

DETAILED DESCRIPTION

Overview

Embodiments discussed below relate to compressing multi-view video. The description will begin with explanation of a system for employing multi-view video and a general approach for compression. Techniques for multi-view video rendering, including identifying parts of multi-view video frames that are likely to be used at the remote end are then described. This will be followed by description of how to use such parts to compress multi-view video in a way that may retain higher fidelity for parts that are more likely to be used for rendering at the remote end.

Multi-View Video Systems

Figure 1:
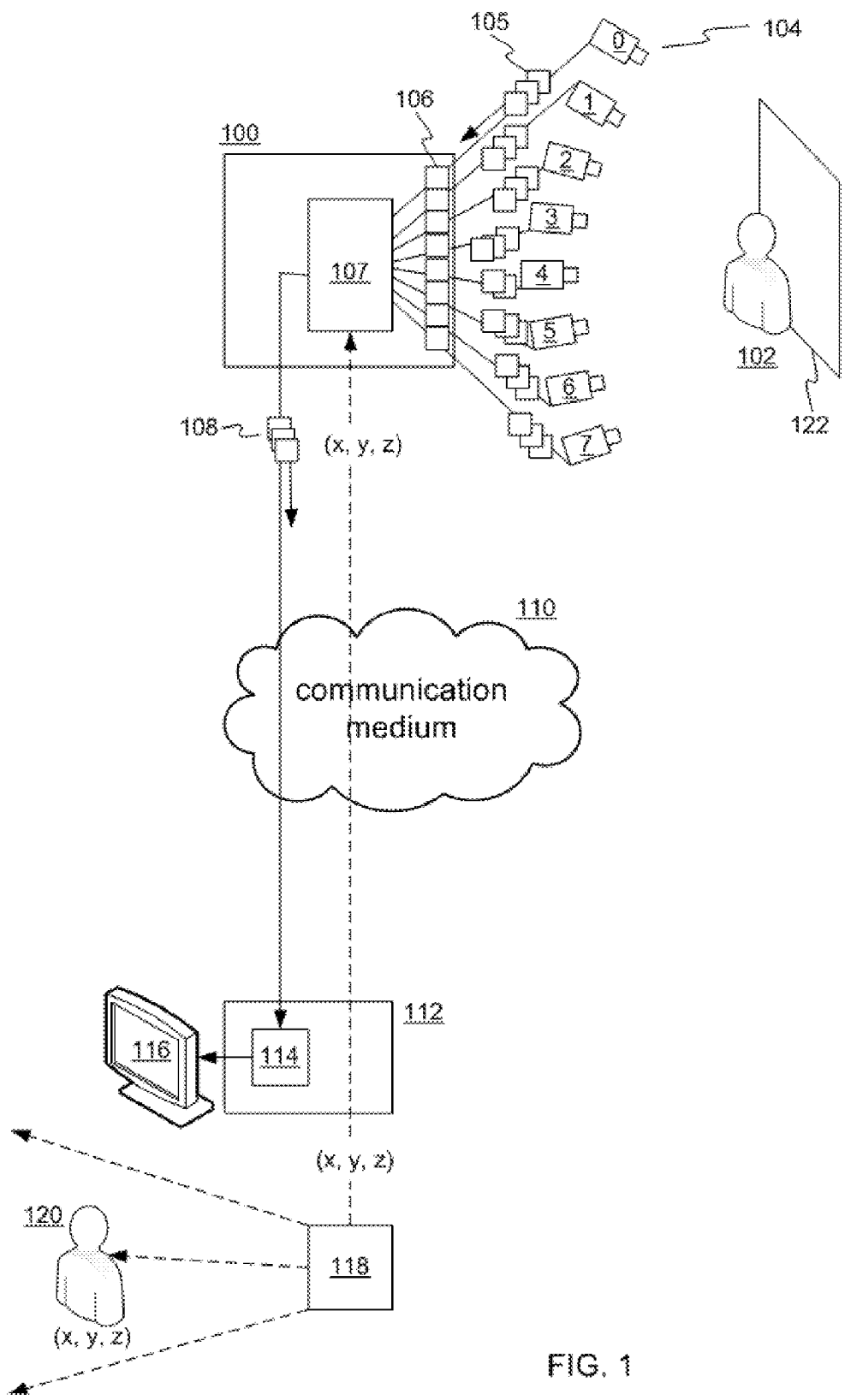
FIG. 1 shows a system for generating and using multi-video.

FIG. 1 shows a system for generating and using multi-video. At a local end, a capturing terminal 100 receives video of a local user 102 from a plurality of video cameras 104. Generally, the video cameras 104 each capture images or frames 105 at some given increment of time or rate. A set of frames 105 captured by each respective camera at about the same time form a macro-frame 106. A computer program 107 may compress the macro-frames and transmit the compressed macro-frames 108 over a communication medium 110 such as a data network, a telecommunication line, etc., to a remote terminal 112. A program 114 decompresses the compressed macro-frames 108. The individual frames of the macro-frames are then synthesized into single images and shown in sequence on display 116. Synthesizing images to provide the correct parallax sensation may involve using various parts of the frames of a macro-frame, since the new viewpoint will not likely coincide with any of the cameras. To that end, the remote terminal 112 may have a detection device 118 to detect the location of the remote viewer 120. The detection device can be one or more video cameras, a depth sensor, etc. The size of the remote viewer 120 in captured video frames may be used to determine distance (z)

of the viewer, and location of the viewer within the frames may be used to determine the viewer's horizontal and vertical position (x, y). Consequently, as the remote viewer 120 moves to different locations the displayed rendering of the captured scene (i.e., local user 102) changes to give the appearance of parallax, where pixels of distant objects (e.g., background 122) "move" on display 116 in greater proportion than pixels of near objects (e.g., local user 102). Note that techniques for synthesizing a plurality of images or frames into a virtual image are described in detail elsewhere.

The terminals 100, 112 may be ordinary desktop computers equipped with the necessary peripheral devices, memory, CPU, network interfaces, etc. The terminals 100, 112 may also be teleconference terminals, possibly equipped with digital signal processors, cameras, microphones, displays, etc. The precise form and makeup of the terminals 100, 112 is not important to implementation of the techniques described herein; any devices capable of machine computation may be used. Furthermore, terminals 100, 112 may have a network interface or other means for communication.

The system shown in FIG. 1 may be used for immersive teleconferencing. The video streams are compressed and sent to the remote site. The video is then decompressed and rendered to the user in an interactive fashion where the user may change their virtual viewpoint from time to time, thus changing how the video is rendered. The quality of user experience may depend on the coding efficiency, which should be high, yet the amount of data transmitted to the remote site should be kept low. To support interactivity, the video should be compressed and sent to the remote site with minimal delay. Furthermore, to support parallax or other effects at the receiving end, the view should be generated at the receiving end using video from plural cameras, which further suggests transmission of multi-view video rather than transmission a single view synthesized/rendered at the capturing terminal.

Figure 2:
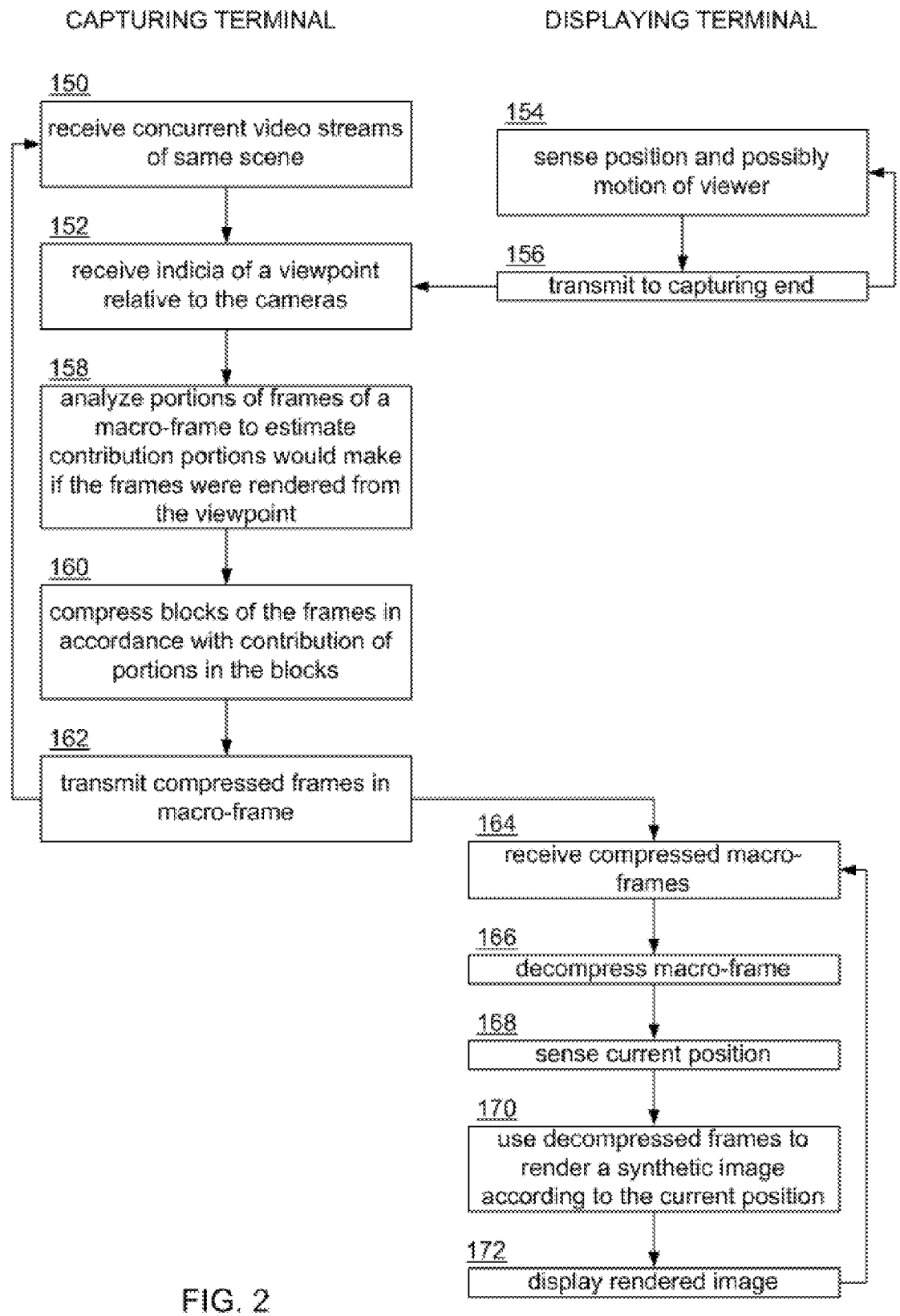
FIG. 2 shows a process for compressing and using multi-view video.

FIG. 2 shows a process for compressing and using multi-view video. A capturing terminal receives 150 video streams from video cameras. The capturing terminal receives 152 indicia of a viewpoint, which the capturing terminal and/or the displaying terminal may model relative to the location and direction of the capturing video cameras. That is, the viewpoint and video cameras are positioned and oriented in a same virtual space relative to each other. In one embodiment the viewpoint is based on information about the position of the viewer at the displaying terminal, in which case the displaying terminal senses 154 the position of the viewer and transmits 156 information about the position of the viewer to the capturing terminal (movement information may also be included, as described later). In other embodiments, the viewpoint may be arranged based on other information, such as a preferred or default viewing position, a "voted" view position (where there are multiple displaying terminals), etc. The viewpoint may also include a view direction, or a view direction may be assumed to be toward the scene, a person in the scene, a central focus point of the video cameras, and so on. How the viewpoint is obtained should not affect the steps used to perform compression. In one embodiment, the viewpoint position may be a prediction of a future expected position of the viewer based on transmission times, past locations of the viewer, and/or information about movement (speed, direction, etc.) of the view from the displaying terminal. In this manner, the displaying terminal may be more likely to receive video having fidelity tuned to the likely position of the viewer at the time it renders and displays the received video.

Regarding compression by the capturing terminal, the capturing terminal, on a macro-frame by macro-frame basis (not necessarily for each macro-frame), analyzes 158 portions of frames in a macro-frame to estimate the contribution that portions of the frames would make if the frames were rendered from the received viewpoint 152. This estimation may take the form of a probability distribution function. That is, the capturing terminal estimates the likelihood of use, degree of contribution, weight, etc. of portions of the frames if the frames were rendered to generate a synthetic image (a to-be-displayed video frame) corresponding to a view, from the viewpoint, of the captured scene in the frames. In this manner, portions may have varying contributions. For example, portions further away from the viewpoint may have lower contribution (or weight). The portions of a frame may have varying or non-uniform contribution; some portions of a frame will have different contribution than other portions of the frame. A portion may be a pixel, an estimated sub-pixel (a point between pixels), a block of the frame (a block of a grid dividing the frame), a computed region, neighborhood average, a pixel chosen by sub-sampling, etc. For discussion, the portions will frequently be referred to as pixels, which should be understood to also describe use of blocks or other types of portions.

Given the expected contributions of portions of the frames of a macro-block, blocks of the frames (not necessarily the same blocks as mentioned above, e.g., superblocks) are compressed in accordance with their expected contributions. In one embodiment, this may involve computing a compression rate or quantization parameter for a block based on the expected contributions of the portions in or near the block (e.g., a local neighborhood). In another embodiment, the expected contributions might be used to select a compression algorithm or may be used to simply delete or effectively eliminate a block. The capturing terminal, perhaps after encapsulating the compressed macro-frame in a communication protocol packet, transmits 162 the compressed macro-frame to the displaying terminal. The steps 150-162 may be continually repeated to send a continuing real-time stream of compressed multi-view video. In such a loop, some steps may not be performed each time. For example, the same viewpoint might be used for several consecutive loops; the sensing 154 and transmitting 156 may occur at a different rate than steps 150, 152, and 158-162.

The displaying terminal receives 164 the compressed macro frames and decompresses 166 the frames of the macro-frame. In one embodiment, the displaying terminal senses 168 the position of the viewer or user at the displaying terminal, and then uses 170 the decompressed frames to render a synthetic image according to the sensed 168 position. The rendering may involve using image data from a plurality of the frames to create parallax effects or otherwise simulate three-dimensional effects. If the viewer is in a position that corresponds to a position between two of the video cameras, then the rendered synthetic image may have combined image data from those two video cameras, and image data from other frames may also be used.

Multi-View Video Rendering for Compression

FIG. 3 shows a process for compressing a macro-frame of multi-view video. As compression by a transmitting terminal may aim to anticipate rendering at the receiving end, some of the steps may be similar to those that a receiving or rendering terminal might perform, thus the reference to "rendering". However, actual rendering, that is, actual generation of a displayable synthetic image is not required. The following may be thought of as approximating or imitating, at a capturing terminal, how multi-view video would be rendered at a remote displaying terminal.

Figure 4:
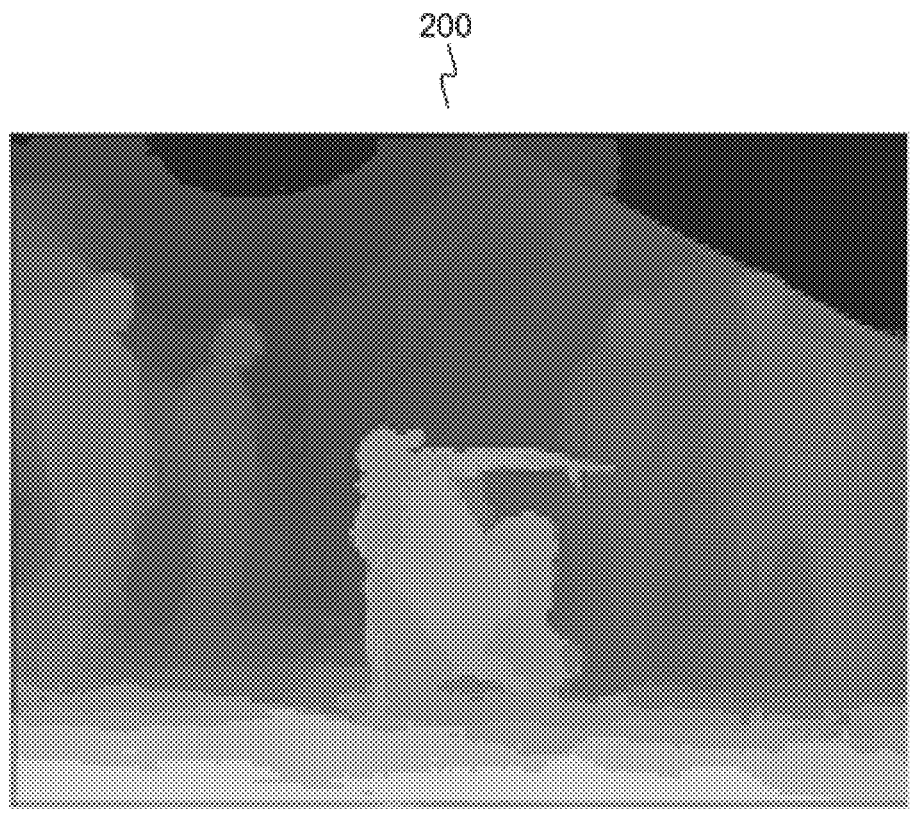
FIG. 4 shows an example depth map of a scene used as an example herein.

The process of FIG. 3 and variations thereof assume the existence of a depth map of the scene that is being captured by the video cameras. A depth map is an image or bitmap whose values or intensities represent distances to points in the scene. FIG. 4 shows the example depth map 200 of a scene used as an example herein. The depth map 200 may be obtained in various ways. For example, the depth map 200 may be obtained by a scanning laser, by analysis of one or more frames of the video cameras (stereoscopic type depth analysis), or other available depth-sensing means. Some modern video cameras are equipped with depth sensors, which may also be used.

Figure 5:
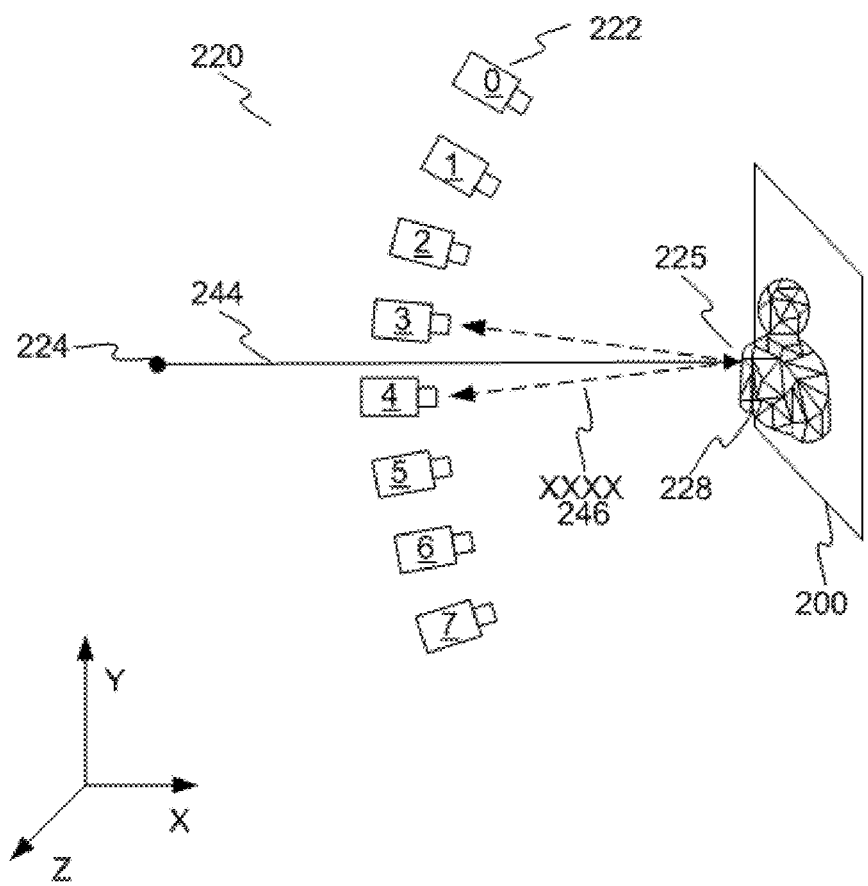
FIG. 5 shows an example of a three-dimensional model.

The process of FIG. 3 also assumes a three-dimensional model, which may be implemented in the hardware and software of the transmitting/capturing terminal. FIG. 5 shows an example of a model 220 with video camera models 222 (corresponding to the capturing video cameras), including position and orientation, a virtual viewpoint 224 representing a position from which a synthetic rendering of the scene will be virtually "viewed" (rendered), and a location 225 of the subject or scene being captured. A depth map 226 may be modeled at a position corresponding to the real-world scene that it represents. In some embodiments described later, a mesh model 228 may also be modeled at the location 225 of the real-world scene or subject.

Figure 7:
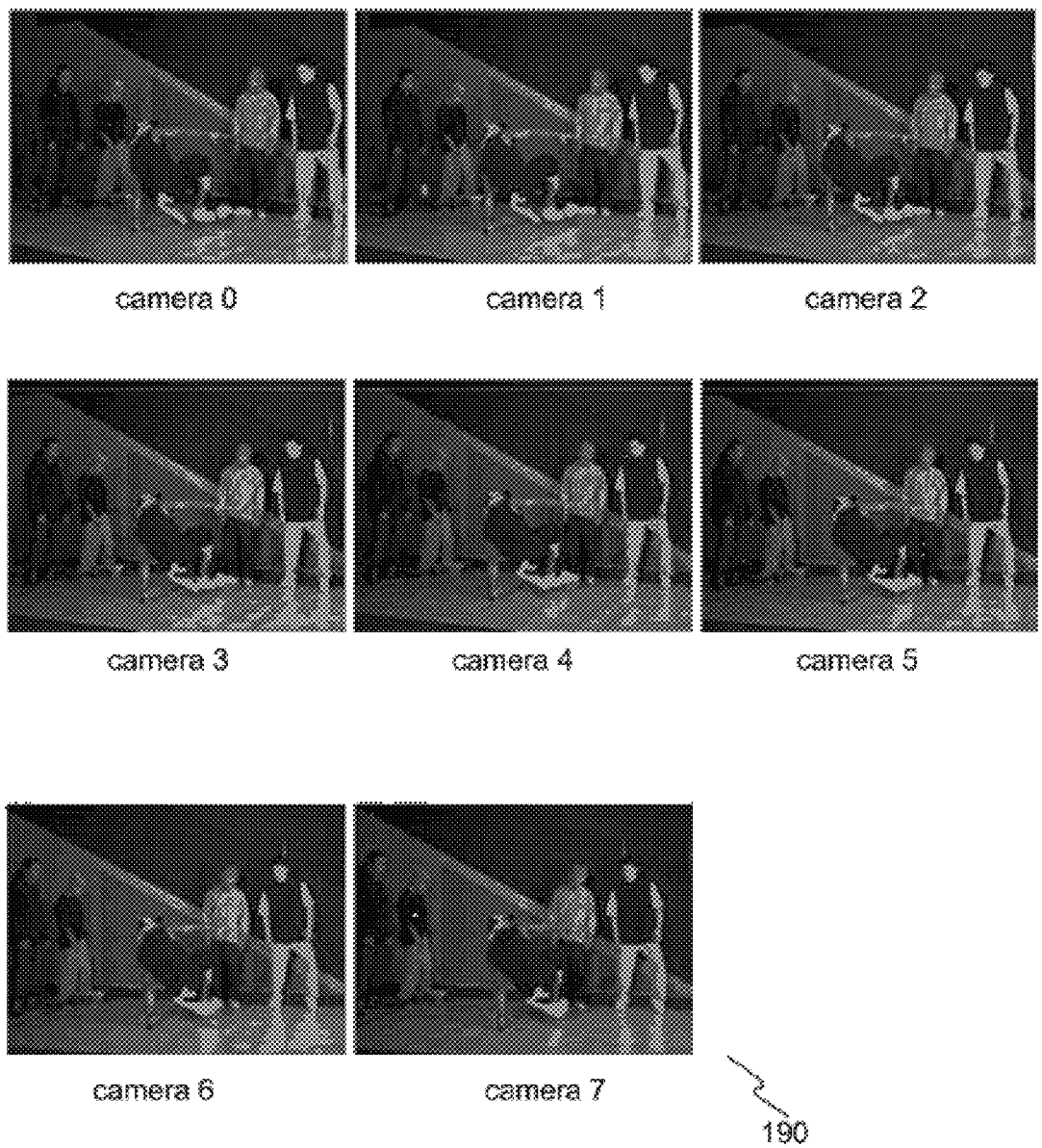
FIG. 7 shows example frames of a macro-frame.

Referring again to FIG. 3, the capturing terminal may begin compression by performing steps that might be performed to render a multi-view macro-frame (see example frames 190 in FIG. 7). First, a macro-frame and depth map 200 are received 240. Given a virtual viewpoint 224, and camera models 222, a to-be-rendered view/image is split 242 into light rays. FIG. 5 shows an example light ray 244. Each such light ray is projected or traced 248 to the surface of the depth map 200 to obtain an intersection therewith. A ray (e.g., ray 246 in FIG. 5) is projected 250 from the intersection to the nearby cameras, for example, cameras 3 and 4. The cameras to be projected to may depend on factors such as which rendering algorithm is being used (some may use more than two views for interpolation), the presence of an occlusion in the scene (a visible camera may be used in the place of an occluded camera), and so on. The intensity of the light ray 244 is computed 252 as the weighted average of the projected rays 246. The weight of a ray 246 can be determined in numerous ways. For example, using multi-texture blending as described in "Unstructured Lumigraph Rendering" (ACM SIGGRAPH, 2001; C. Buehler, M. Bosse, L. McMillan, S. J. Gortler, and M. F. Cohen). In one embodiment, the angular difference between the light ray 244 to be rendered and a projected ray 246 can be used, assuming that the cameras are roughly equidistant from the scene or an object or person therein. One of ordinary skill in the art of computer graphics will appreciate that there are many ways to compute the texture and intensity of a light ray from two or more given images or frames. The weights of the rays 246 (for corresponding of the light rays 244) that are projected to a frame form a weight map for that frame. A weight map is computed for each frame.

Figure 6:
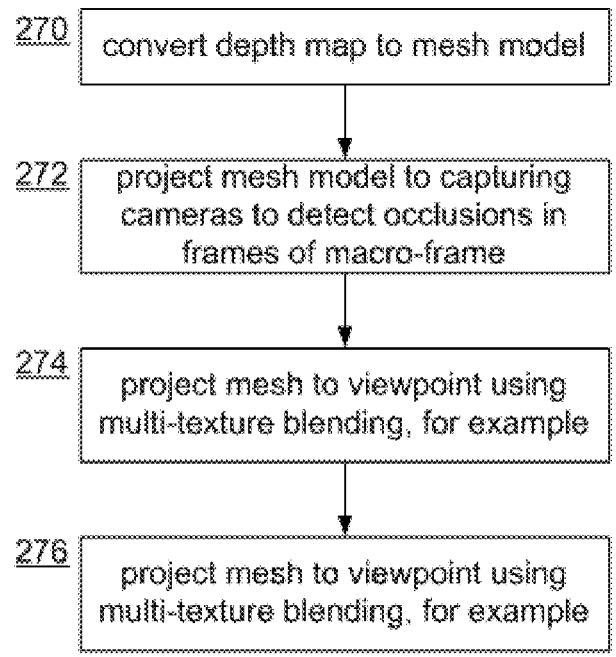
FIG. 6 shows a process for taking into consideration occlusions or holes.

In "rendering" the light rays, there may be occlusions and holes when computing the light ray intersection with the geometry of the scene (e.g., the depth map). FIG. 6 shows a process for taking into consideration occlusions or holes. First, the depth map is converted 270 to a three-dimensional mesh surface or model such as mesh model 228 (FIG. 5). In one embodiment, each pixel of the depth map corresponds to a vertex of the mesh model 228. In other embodiments, for scaling, vertices of the mesh model 228 may be eliminated or they may be added by interpolation. The mesh model 228 is projected 272 to the capturing camera models 222 to detect any potential occlusions in the captured frames that are currently being processed. The mesh model 228 is also projected 274 to the virtual rendering viewpoint 224 using multi-texture blending in a manner similar to the method in "Unstructured Lumigraph Rendering", cited above. For each vertex in the synthetic image being rendered, the vertex is projected to the nearby captured frames to locate the corresponding texture coordinate. This process takes into account the occlusions computed earlier. That is, if a vertex is occluded in a nearby view, its weight for that camera will be set to zero.

Figure 8:
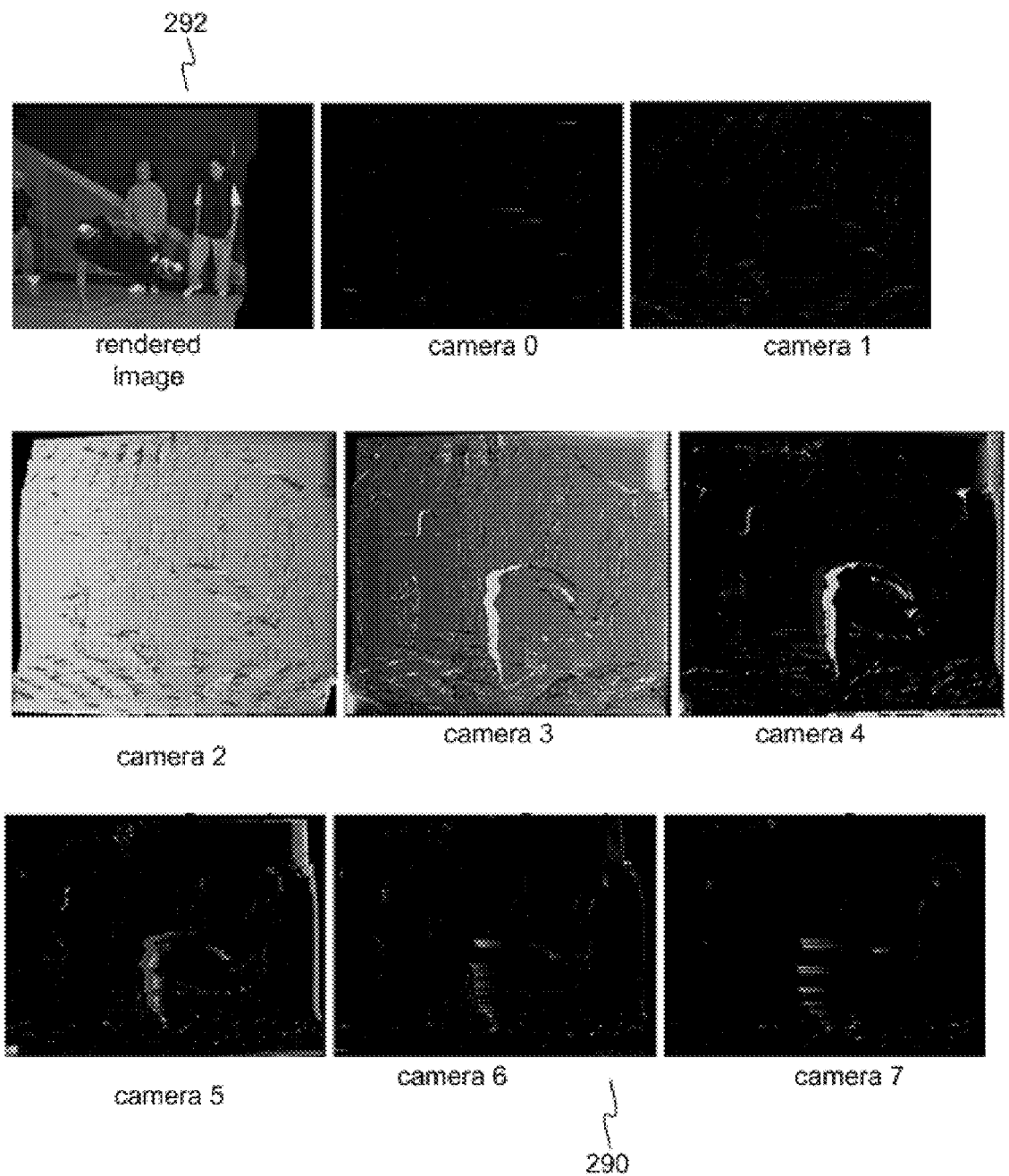
FIG. 8 shows weight maps.

FIG. 7 shows example frames 190 of a macro-frame. FIG. 8 shows weight maps 290 corresponding to the frames 190 in FIG. 7, as computed by the methods of FIGS. 5 and 6. The weight maps 290 show that whether a pixel in a captured video frame 190 will be useful for rendering the particular view of viewpoint 224, for example. Brighter pixels have larger weights. Note that even for the depth map of camera 7, the camera farthest from the virtual viewpoint 224, there are pixels deemed significant (having weight) due to detected occlusions. Rendered image 292 is an example of a synthetic image rendered at the virtual viewpoint 224 using image data from frames 190 (having as a by-product the weight maps 290). As will be described in detail later, the weights of the pixels can be used to determine how to compress blocks of the corresponding frames. Generally, pixels whose corresponding weights (in the pixels' frames' corresponding weight map) have greater contribution, and encompassing blocks of the frame may be compressed with higher fidelity (less compression).

In an embodiment where there are multiple viewpoints, as in the case of multiple remote viewers, weight maps are computed individually for each viewpoint/viewer and the weight maps may be averaged to obtain a combined weight map.

In one embodiment, where a probability distribution is based on an average viewer position in relation to the display for the application. That is, the capturing and/or transmitting server may try to predict where a viewer will be based on geometry of the viewing area, the position and/or orientation of a display (or projector, etc.) that will be displaying the video to the viewer, the locations of furniture, frequent past viewing positions or averages thereof, and other a priori information. Such prediction of viewer position (or an estimation of a probability distribution of an average viewer position) might take into account the content of the video, the time of day, and the target display, or other indicia.

To improve the accuracy of predicting which pixels are likely to be used for rendering at the receiving end, it may be assumed that given a time T of network delay between two communicating teleconferencing terminals, when the capturing terminal receives the displaying terminal's viewpoint (sent at time t), the time will already be T+t when compression is performed. If the displaying terminal also transmits information about the viewer's motion or speed, it is possible for the capturing terminal to compute the virtual viewpoint as a predicted future position of the viewer moving for a given duration. Multiple virtual rendering within an estimate range can be performed to compute a combined weight map for compression. If the viewer's viewpoint does not change significantly, a similar effect may be achieved by smoothing the computed weight maps over a series of iterations. During adaptive multi-view compression (discussed below), the weight map may be converted into a coarser map for macroblock based encoding, which also effectively smoothes the weight map.

Adaptive Compression

Figure 9:
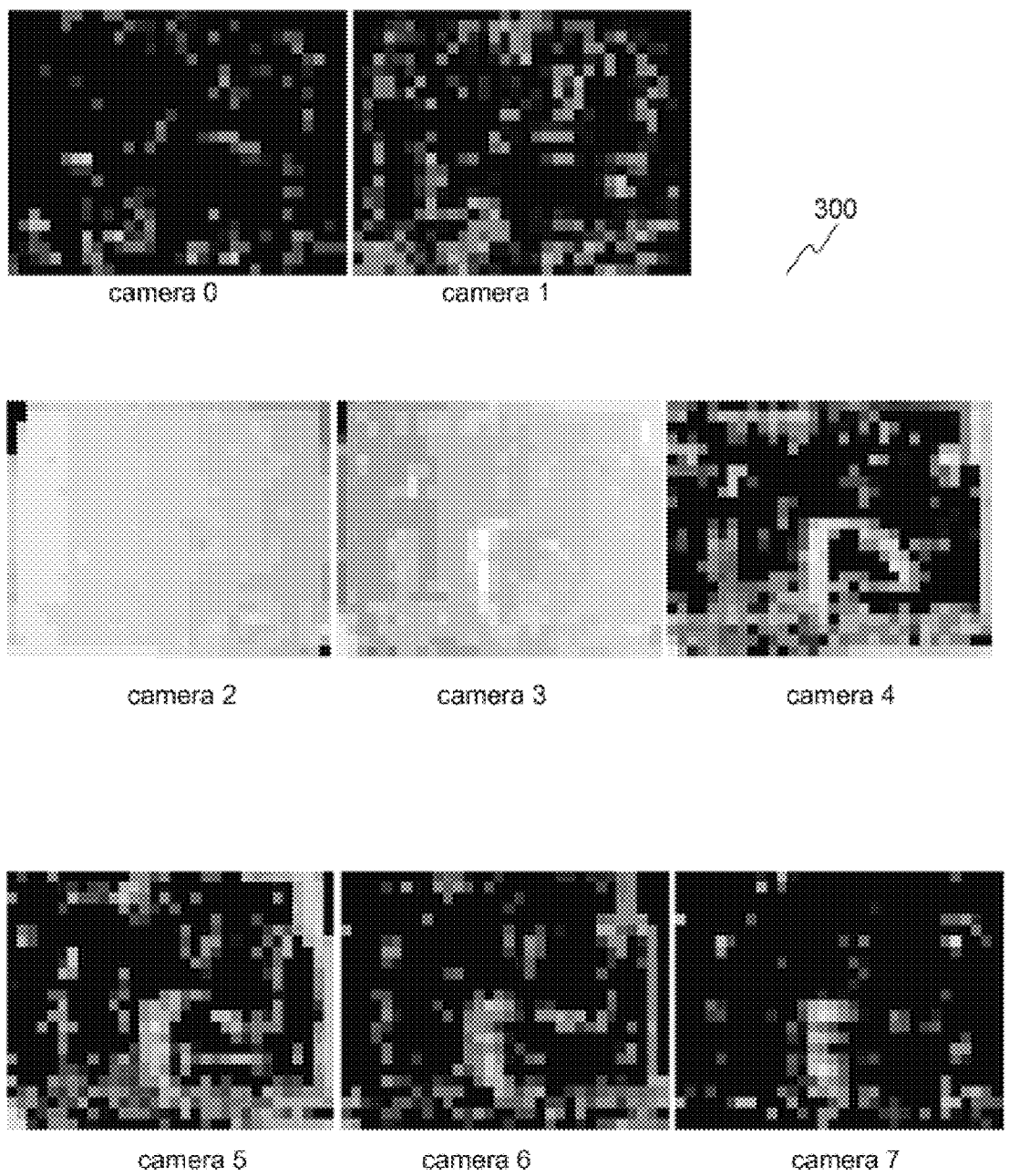
FIG. 9 illustrates the final quantization parameter values for example frames.
Figure 10:
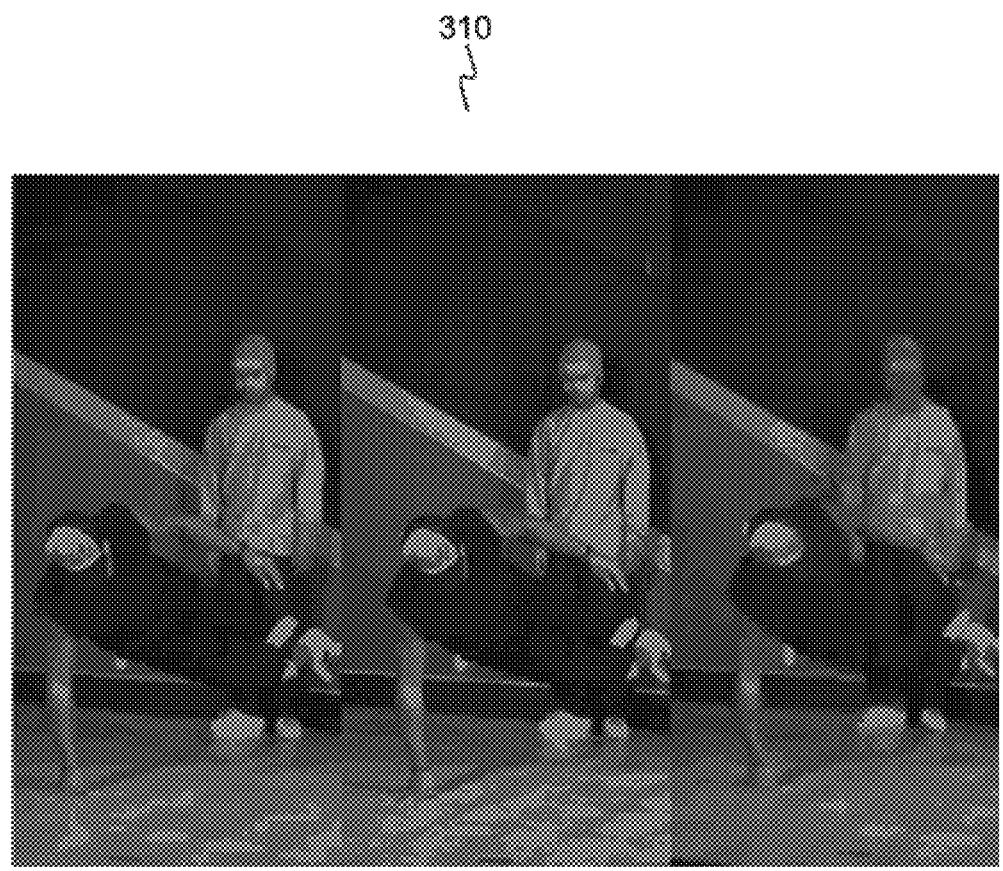
FIG. 10 shows encoded (compressed) images.

To compress the frames of a macro-frame, portions of the frames that are more likely to be used by the receiving terminal are compressed with higher fidelity. For that purpose, many techniques can be used. Codecs that directly take into consideration varying degree of fidelity exist; the motion compensated residual may be multiplied by a gain proportional to the importance, or portions with higher weight may be more finely quantized. In one embodiment, a modified version of the H.264 codec may be used, which allows the quantization parameter (QP) to be pre-specified for each macroblock of a frame. The higher the QP, the coarser the quantization. The QP may be computed by any rule that attributes lower QP to blocks with generally higher weights. For example, each macroblock $QP_{mb}$ can be computed by using a BaseQp and an ad-hoc mapping:

$$QP_{mb} = BaseQp - 6 \log_2 \sqrt{\Sigma_{mb} w_i^2 / 256} \quad (1)$$

where $w_i$ is the predicted weight for each pixel in the macroblock. Note that formula (1) takes into consideration the logarithmic scale of PQ in H.264, which doubles the quantization step for each increment of 6 in QP. Based on the above rule, QP is computed for each macroblock in each of the frames, and then the modified H.264 is used. Note that the QP may be limited to the maximum H.264 value of 51. FIG. 9 illustrates the final QP values 300 for the example frames 190 in FIG. 7. FIG. 10 shows a segment of the corresponding encoded (compressed) images 310 for cameras 2, 3, and 4. Note how portions of the images 310 that have low weights (and thus high QP) are more coarsely quantized, reflecting the lower likelihood that they will contribute to a rendering.

Experimental results have shown a bitrate savings of approximately half the rate for the same peak signal-to-noise ratio (PSNR) in the synthesized image. Actual results will depend on system elements, including the motion dynamics of the viewer, total transmission delay, and so forth. For the dance sequence illustrated herein, methods described above achieved the same PSNR at around half the rate as standard H.264 compression. Analysis has also shown that the methods have a tolerance for viewpoint deviation (error between the predicted and actual viewer viewpoint). A deviation of about 10 cm may result in about 1 dB of loss. At an uncertainty of 20 cm, the loss may be about 2 dB. Even with a 200 ms delay, precision of better than 10 cm should be possible with respect to the viewer's head position.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. Computer-readable storage hardware storing information to enable one or more devices that process and transmit multi-view video to perform a method, the method comprising:

receiving video streams of a real world scene, the video streams concurrently captured by respective cameras comprising a first camera and a second camera, the video streams comprising a first video stream captured by the first camera and a second video stream captured by the second camera;

receiving different viewpoints corresponding to positions of viewing a rendering of the multi-view video at respective times;

computing first compression rates for the first video stream and second compression rates for the second video stream by modelling in at least two dimensions the viewpoints relative to the positions and directions of the first and second cameras and modelling the positions and directions of the first and second cameras relative to each other, the first compression rates corresponding to the viewpoints, respectively, and the second compression rates corresponding to the viewpoints, respectively, wherein the viewpoints correspond to positions of a remote viewer;

compressing the first video stream according to the first compression rates, and compressing the second video stream according to the second compression rates, respectively, wherein the multi-view video comprises the compressed first video stream and the compressed second video stream; and transmitting the compressed first video stream and the compressed second video stream, which comprise the multi-view video, via a network to a remote terminal that receives the video streams, synthesizes the video streams into a synthetic video stream, and displays the synthetic video, wherein the displayed synthetic video stream comprises the rendering of the multi-view video.

2. Computer-readable storage hardware according to claim 1, wherein the viewpoints are computed based on averages of positions of the remote viewer relative to a display of the remote terminal.

3. Computer-readable storage hardware according to claim 1, wherein the positions of the remote viewer comprise predicted positions of the remote viewer.

4. Computer-readable storage hardware according to claim 3, wherein the predicted positions are based on indicia of past positions of the remote viewer.

5. Computer-readable storage hardware according to claim 1, wherein the viewpoints are based on average viewer positions near a display of the remote terminal that is displaying the synthetic video stream.

6. Computer-readable storage hardware according to claim 1, wherein the viewpoints are based on geometry of a physical area where the multi-view video is being displayed.

7. Computer-readable storage hardware according to claim 1, wherein the viewpoints are computed based on received information about sensed locations of the remote viewer at the remote terminal and based on information about time that will pass before displaying the synthetic video stream by the remote terminal.

8. Computer-readable storage hardware according to claim 7, wherein the information about the locations of the remote viewer includes information indicating movement of the remote viewer.

9. Computer-readable storage hardware according to claim 1, wherein the method further comprises computing a mesh from a depth map of the real world scene, using the depth map to identify potential occlusions, and computing weights of such portions accordingly, the weights being used in the computing of the compression rates.

10. A computer-implemented method comprising:
receiving from video cameras respective video streams of a subject being captured by the video cameras, the video streams comprising a first video stream and a second video stream, the first video stream comprised of first frames captured by a first of the video cameras, the second video stream comprised of second frames captured by a second of the video cameras, the first video stream not comprised of the second frames, and the second video stream not comprised of the first video frames;
receiving an indication of a viewpoint from a remote terminal, the viewpoint corresponding to a position or direction of a user at the remote terminal relative to the remote terminal or a display thereof;
computing a first weight for the first video stream, and computing a second weight for the second video stream, wherein the computing the first and second weights is based on: (i) a direction or position corresponding to the first video camera, (ii) a direction or position corresponding to the second video camera, and (iii) a position or direction of the viewpoint relative to the directions and positions of the first and second video cameras, wherein the position or direction of the viewpoint corresponds to a position or direction within view areas of the first and second video cameras, respectively;
compressing the first video stream according to the first weight, and compressing the second video stream according to the second weight; and
transmitting the compressed first video stream and the compressed second video stream via a network to the remote device, wherein the remote device synthesizes the first and second video streams into a synthetic video stream displayed by the remote device.

11. A computer-implemented method according to claim 10, wherein the viewpoint corresponds to one or more of: a past position of a remote viewer at the remote device, a layout of a room where the multi-view video is being displayed, or a latency value comprising a network latency.

12. A computer-implemented method according to claim 10, wherein the computing further computes:
first portion-specific compression rates for respective individual portions of a first video frame of the first video stream, and
second portion-specific compression rates for respective individual portions of a second video frame of the second video stream.

13. A computer-implemented method according to claim 10 wherein the modelling further comprises forming a three-dimensional model of the scene relative to the viewpoints and relative to the positions and directions of the cameras, and wherein the first compression rate and the second compression rate are computed based at least in part on the three-dimensional model.

14. A computer-implemented method according to claim 10, further comprising identifying occlusions in the video streams and computing the compression rates according to the occlusions.

15. A computer-implemented method according to claim 10, wherein the viewpoint is computed by estimating a future position of the user.

16. A computer-implemented method according to claim 10, wherein the computing the first weight is further based on a model of the subject, and wherein computing the second weight is further based on the model of the subject.

17. A computer-implemented method according to claim 16, further comprising computing the first weight and the second weight by finding an intersection of the model of the subject with a first ray projected from a point positioned according to the position of the viewpoint, computing the first weight by projecting a second ray from the intersection to a second point positioned according the position or direction corresponding to the first video camera, and computing the second weight by projecting a third ray from the intersection to a third point positioned according to the position or direction corresponding to the second video camera.

18. A computer-implemented method according to claim 17, wherein the model is comprised of, or derived from, a depth map that is captured concurrently with capturing of the first video stream and concurrently with capturing of the second video stream.

19. An apparatus comprising:
processing hardware and storage hardware;
the storage hardware storing a viewpoint, a first video stream of a scene or subject, and a second video stream of the scene or subject, the first video stream having been captured by a first video camera, the second video stream having been captured by a second video camera;
the storage hardware storing first location information and second location information, the first location information corresponding to a first position, or a first direction, or both, of the first video camera, and the second location information corresponding to a second position, or a second direction, or both, of the second video camera;
the processing hardware computing a first compression rate for the first video stream, and computing a second compression rate for the second video stream, wherein both compression rates are computed by modelling the viewpoint relative to the first position and to the second position, and by modeling the first position relative to the second position, wherein the modelled viewpoint corresponds to a position within capturing areas of the first and second cameras, respectively;
compressing the first video stream according to the first compression rate, and compressing the second video stream according to the second compression rate; and
a network interface transmitting the first video stream and the second video stream via a network to a remote terminal that computes a synthesis of the first and second video streams and which displays the synthesis of the first video stream and the second video stream, wherein the remote terminal generates the synthesis based on a second viewpoint.

20. An apparatus according to claim 19, wherein the viewpoint and the second viewpoint are computed based on one or more sensed locations of a user at the remote terminal.

21. An apparatus according to claim 19, wherein the viewpoint and the second viewpoint correspond to different respective positions.

\* \* \* \* \*